3,326,878
POLYMERIZATION OF PROPYLENE IN THE PRESENCE OF A CATALYST CONSISTING OF THE REACTION PRODUCT OF A TRANSITION METAL HALIDE WITH SULFUR AND AN ORGANOALUMINUM COMPOUND
Pierre Dassesse, Jemeppe-sur-Sambre, and Roger Dechenne, Strombeek, Belgium, assignors to Solvay & Cie, Brussels, Belgium, a Belgian company
No Drawing. Filed Jan. 28, 1964, Ser. No. 340,555
Claims priority, application Netherlands, Jan. 28, 1963, 288,255
5 Claims. (Cl. 260—93.7)

The present invention concerns a process for the polymerization of propylene to produce crystalline polymers, a major portion of which has an isotactic structure.

It is known how to polymerize propylene in contact with complex catalyst obtained by the reaction of halides or oxyhalides of titanium, vanadium or zirconium with metals, metal hydrides or organometallic compounds of metals from Groups I, II and III of the Periodic Classification of the Elements.

In general, the polymers prepared with the aid of such catalysts contain a fraction insoluble in boiling heptane which rarely amounts to more than 75 to 80% of the total product.

In order to obtain a largely crystalline polypropylene, it has already been proposed to carry out the process in the presence of a catalyst obtained by reacting an organometallic compound with the hydrocarbon-insoluble fraction of the complex compound obtained by the interaction of a transition metal compound and a compound of the formula $H_2X$ wherein X is a selenium sulfur atom (Netherlands Patent No. 102,907).

The exact nature of the second constituent in these catalysts has not been elucidated. It probably reacts as a complex containing very variable proportions of three compounds with the formulae $TiX_2$, $TiXCl$ and $TiXCl_2$ wherein X is a selenium or sulfur atom.

It has now been found that a crystalline precipitate, probably of the same type as that defined above, is formed by allowing sulfur to react with a lower transition metal halide.

The polymerization catalysts obtained by the reaction between this crystalline precipitate and an organometallic compound possess a remarkable activity and produce a polypropylene with a high content of the product insoluble in boiling heptane.

The process according to the invention consists in the execution of a polymerization of propylene in the presence of a catalyst obtained by reacting the complex compound, which is obtained by the interaction of sulfur and a lower transition metal halide, with an organometallic compound.

The lower transition metal halides employed for the process according to the invention are principally the halides of metals in Groups IVa, Va and VIa of the Periodic Classification at a valency state lower than the maximum valency. In practice, it is preferred to make use of trivalent metal halides, such as the trichlorides of vanadium and zirconium and particularly titanium trichloride.

Those lower halides which, in combination with certain organometallic compounds, already produce highly crystalline polypropylene, such as purple $TiCl_3$, are especially suitable for application. In that case, the crystallinity of the resultant products is improved.

However, a particularly interesting application of the process according to the invention results when use is made as starting materials of certain lower halides which do not possess a good stereospecificity on their own and cannot produce highly crystalline polypropylene.

Thus, the $\beta$-form of $TiCl_3$ is normally obtained by the reduction of $TiCl_4$ with an organometallic compound from Groups I to III or with the combination of a Group III metal or of a Group IVb organometallic compound with a Group III halide.

This $\beta$-$TiCl_3$ produces a polypropylene which does not contain more than 50% of the product insoluble in boiling heptane. However, the reaction of these halides with sulfur leads to the formation of a catalyst which possesses an excellent stereospecificity without its activity as a catalyst being reduced to a significant extent.

The reaction between the sulfur and the lower halide may be carried out in the solid state or in suspension in a hydrocarbon diluent, but it is always preferable to have at least one of the reagents in the form of a solution. Thus, it is possible to react $TiCl_3$ with a solution of sulfur in benzene.

The reaction between $TiCl_3$ and sulfur may be carried out at various temperatures. An elevated temperature always appears to bring about a considerable promotion of the reaction.

At the end of this reaction, a black-brown solid is separated which is washed and then dried.

An analysis of the elements in a product of this type gives the results reproduced in the table below:

TABLE I

| Element | G./kg. | G. atoms/kg. | G. atoms/g. atom of Ti |
|---|---|---|---|
| Ti | 337 | 7.04 | 1 |
| S | 225 | 7.02 | 0.997 |
| Cl | 430 | 12.10 | 1.72 |
| Errors and losses | 8 | | |
| | 1,000 | | |

Moreover, a volumetric estimation indicates that 25.7% of the titanium is present in the precipitate in the trivalent state.

Furthermore, various tests have shown that it does not behave like a mixture of $TiCl_3$ and $TiS_2$; the precipitate does not contain either of these compounds.

The results therefore seem to indicate that the precipitate consists of a mixture of $TiSCl_2$ (about 70%) and of $TiSCl$ (about 30%). The relative content of these two products evidently varies as a function of the practical conditions adopted for the preparation of the precipitate.

The organometallic compound reacted with this precipitate when the polymerization catalyst is prepared is chosen from among organometallic derivatives of metals from Groups I, II, III and IV of the Periodic Classification. In general, it is preferred to employ, optionally halogenated, alkyl derivatives of aluminium.

The process according to the invention offers particular advantages when use is made of triethylaluminium or another trialkylaluminium as the activator. It is well known that when organoaluminium compounds of this type are employed for the activation of certain titanium halides, the polypropylenes obtained are of low crystallinity but they are produced at a very fast rate of polymerization. On the other hand, the activation of the same halides with diethylaluminium chloride leads to highly crystalline products but the catalysts then exhibit a much weaker activity. By contrast, the process according to the invention allows the production of highly crystalline polypropylenes with an appreciable catalytic activity when the chlorosulfides of titanium are activated by triethylaluminium.

The following examples illustrate the object of the present invention without in any way limiting its scope.

EXAMPLE 1

(a) *Preparation of the complex compound starting from sulfur and α-titanium trichloride.*

7.0 g. of sulfur, as a solution in 200 cc. of dry benzene, and 70.0 of purple titanium trichloride are introduced into a 0.5 l. autoclave. This is heated at 120° C. and stirred for 8 hours.

At the end of the reaction, about 25 g. of a black-brown solid are separated. This precipitate is washed with benzene and then dried. An analysis of the elements in this product gives the results reproduced in Table I above. Its composition is probably as follows: $TiSCl_2$ 72%; $TiSCl$ 28%. It is wholly soluble in ethanol, showing that it is free from titanium sulfides since they are insoluble in this solvent.

(b) *Polymerization of propylene*

325 mg. of the precipitate obtained above are suspended in 20 cc. of dry hexane. 494 mg. of triethylaluminium are added to the suspension, and it is stirred at 60° C. for one hour.

The suspension is thereafter introduced into a stainless steel autoclave of 1.5 l. capacity which already contains 500 cc. of hexane. 250 g. of pure propylene are than passed in, and it is heated at 80° C. for 5 hours.

After withdrawing the unreacted monomer gas, the suspension is poured into methanol and stirred. Finally, the polymer is separated from the larger portion of liquid phase, and it is subjected to steam distillation in the presence of sodium hydroxide solution.

After drying, 184 g. of a polypropylene are obtained with a crystallinity content of 50%, according to X-ray analysis.

Table II below gives the results of various tests carried out under analogous conditions, either with chlorosulfide precipitates obtained in accordance with the invention or with other catalytic systems base on $\alpha$-$TiCl_3$, by way of comparison.

advantageous characteristics of the process according to the invention (test No. 5).

EXAMPLE 2

(a) *Preparation of the complex compound starting from sulfur and β-$TiCl_3$*

The procedure is exactly as in Example 1 except for the replacement of purple $\alpha$-$TiCl_3$ by brown $\beta$-$TiCl_3$.

An analysis of the elements in the resultant chlorosulfide product gives the results shown in Table III.

TABLE III

| Element | G./kg. | G. atom/kg. | G. atom/g. atom of Ti |
|---|---|---|---|
| Ti | 289 | 6.04 | 1 |
| S | 229 | 7.15 | 1.19 |
| Cl | 393 | 11.08 | 1.84 |
| Al and losses | 89 | | |
| | 1,000 | | |

The X-ray diffraction spectrum of this chlorosulfide is very similar to that of the product prepared in Example 1. Peaks due to $\beta$-$TiCl_3$ are no longer found showing that there has been a chemical reaction accompanied by a complete modification of the crystalline structure.

(b) *Polymerization of propylene*

Propylene is polymerized under the same conditions as in Example 1, by employing the precipitate made as above starting from $\beta$-$TiCl_3$. The results obtained are given in Table IV below.

By way of comparison, the results of a test carried out by means of $\beta$-$TiCl_3$ on its own have also been given.

TABLE II

| Test No. | 1 | 2 | 3 | 4 | 5 | 6 |
|---|---|---|---|---|---|---|
| Nature of catalyst | Chlorosulfide | Chlorosulfide | Chlorosulfide | $TiCl_3$ | $TiCl_3$ | $TiCl_3$ |
| Weight of catalyst, mg | 325 | 359 | 337 | 68 | 59 | 68 |
| Nature of activator | $AlEt_3$ | $AlEt_3$ | $AlEt_3$ | $AlEt_3$ | $AlEt_3$ | $AlEt_3$ |
| Weight of activator, mg | 494 | 611 | 511 | 226 | 75 | 84 |
| Nature of additive | | | | $TiS_2$ | S | |
| Weight of additive, mg | | | | 61 | 9 | |
| Dispersing agent | n-Hexane | n-Hexane | n-Hexane | n-Hexane | n-Hexane | n-Hexane |
| Polymerization: | | | | | | |
| Temp. (° C.) | 80 | 60 | 90 | 80 | 80 | 80 |
| Time (hr.) | 5 | 5 | 4 | 5 | 5 | 2 |
| Yield, g. of polypropylene | 184 | 101 | 202 | 200 | 56 | 90 |
| Activity at 1,500 mm. Hg, as g. of polypropylene/g. of $TiCl_3$[1] per hr | 18.9 | 9.4 | 27.8 | 67 | 29.5 | 154.5 |
| Intrinsic viscosity, [η] in litre per gram | 0.73 | 0.82 | 0.69 | 0.63 | 0.69 | 0.54 |
| X-ray crystallinity, percent | 50 | 50 | 51 | 48 | 50 | 35 |
| Percent insoluble in boiling heptane | | 74.8 | 72.1 | 63.3 | 52.4 | 50.8 |

[1] Or g. of chlorosulfide.

The experimental results reproduced in the table above indicate that:

(a) The polypropylenes prepared by means of the catalysts based on titanium chlorosulfides obtained according to the invention are much more crystalline than those obtained by starting from titanium trichloride, when the employed activator is the same ($AlEt_3$) (see tests No. 1, 2 and 3 compared with test No. 6).

(b) A catalyst based on $TiCl_3 + TiS_2$ with a composition similar to that of the titanium chlorosulfides exhibits properties which are altogether different though they resemble those for a catalyst based on the $TiCl_3$ from which they are derived (test No. 4).

(c) The addition of sulfur to a $TiCl_3$–$AlEt_3$ catalyst brings about a reduction in the catalytic activity without leading to a net increase in the crystallinity of the polypropylene products; its effect does not exhibit any of the

TABLE IV

| Test No. | 1 | 2 |
|---|---|---|
| Nature of catalyst | $\beta$-$TiCl_3$ | Chlorosulfide |
| Weight of catalyst, mg | 87 | 360 |
| Nature of activator | $AlEt_3$ | $AlEt_3$ |
| Weight of activator, mg | 126 | 544 |
| Dispersing agent | n-Hexane | n-Hexane |
| Polymerization: | | |
| Temp. (° C.) | 80 | 80 |
| Time (hr.) | 5 | 5 |
| Yield, g. of polypropylene | 117 | 155 |
| Activity at 1,500 mm. Hg, as g. of polypropylene/ g. of $TiCl_3$[1] per hr | 37.4 | 13.9 |
| Intrinsic viscosity, [η] in litre per gram | 0.53 | 0.73 |
| X-ray crystallinity, percent | 35 | 43 |
| Percent insoluble in boiling heptane | 49.4 | 65.3 |

[1] Or g. of chlorosulfide.

The results obtained in this case confirm those from Example 1 and show that the chlorosulfide catalyst produces a much more crystalline polypropylene than that obtained by starting from $TiCl_3$.

We claim:

1. Process for the polymerization of propylene into crystalline high polymers, comprising contacting propylene with a catalyst comprising the reaction product of (a) mixed chlorosulfides prepared by reacting a trivalent transition metal halide selected from the group consisting of vanadium trichloride, zirconium trichloride and titanium trichloride with elemental sulfur and (b) an organometallic compound selected from the group consisting of trialkylaluminums and alkylaluminum halides.

2. Process according to claim 1, in which the organometallic compound is triethylaluminum.

3. Process according to claim 1, in which the organometallic compound is diethylaluminum chloride.

4. Process according to claim 1, in which the trivalent transition metal halide is titanium trichloride.

5. Process for the polymerization of propylene into crystalline high polymers comprising contacting propylene with the reaction product of (a) mixed chlorosulfides prepared by reacting titanium trichloride with elemental sulfur at a temperature of about 120° C. and (b) a trialkylaluminum.

References Cited

UNITED STATES PATENTS

| | | | |
|---|---|---|---|
| 3,045,001 | 7/1962 | Berger | 260—93.5 |
| 3,069,446 | 12/1962 | Argabright | 260—429.5 |
| 3,147,239 | 9/1964 | Canterino et al. | 260—94.7 |
| 3,159,614 | 12/1964 | Bloyaert | 260—93.7 |
| 3,257,370 | 6/1966 | Natta et al. | 260—93.7 |

JOSEPH L. SCHOFER, *Primary Examiner.*

M. KURTZMAN, *Assistant Examiner.*